(12) United States Patent
Thomas et al.

(10) Patent No.: US 11,012,332 B2
(45) Date of Patent: May 18, 2021

(54) DYNAMIC NETWORK MANAGEMENT BASED ON USER, DEVICE, APPLICATION, AND NETWORK CHARACTERISTICS

(71) Applicant: International Business Machines Corporation, Armonk, NY (US)

(72) Inventors: Mathews Thomas, Flower Mound, TX (US); Subil Mathew Abraham, Lewisville, TX (US); Janki Vora, Lewisville, TX (US); Utpal Mangla, Toronto (CA); Amandeep Singh, Dallas, TX (US); Sharath Prasad Krishna Prasad, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 16/387,615

(22) Filed: Apr. 18, 2019

(65) Prior Publication Data
US 2020/0336398 A1    Oct. 22, 2020

(51) Int. Cl.
*G06F 15/173* (2006.01)
*H04L 12/26* (2006.01)
(Continued)

(52) U.S. Cl.
CPC ...... *H04L 43/0817* (2013.01); *H04L 41/0843* (2013.01); *H04L 41/12* (2013.01);
(Continued)

(58) Field of Classification Search
CPC . H04L 43/0817; H04L 41/0843; H04L 41/12; H04L 41/16; H04L 43/04;
(Continued)

(56) References Cited

U.S. PATENT DOCUMENTS 7,289,972 B2   10/2007  Rieser
8,271,025 B2    9/2012  Brisebois
(Continued)

OTHER PUBLICATIONS

"Handheld Systems", Focus Infocom, © 2019 Focus Infocom GmbH, 3 pages, <https://focus-infocom.de/measurement-systems/handheld-systems/mpsm-i:>.

(Continued)

*Primary Examiner* — Alan S Chou
(74) *Attorney, Agent, or Firm* — Randy E. Tejeda (57) ABSTRACT

In an approach to dynamic network management based on user, device, application, and predicted network characteristics, one or more computer processors identify one or more network interfaces. The one or more computer processors determine one or more network performance parameters and capabilities of the identified network interfaces. The one or more computer processors determine a highest ranked network connection based on the determined network performance parameters and capabilities of the identified network interfaces. The one or more computer processors generate one or more network templates based on the determined highest ranked network connection and associated network performance parameters. The one or more computer processors apply the one or more generated network templates to a plurality of entities and devices.

20 Claims, 4 Drawing Sheets

(51) Int. Cl.
*H04L 12/24* (2006.01)
*H04L 12/803* (2013.01)

(52) U.S. Cl.
CPC .............. *H04L 41/16* (2013.01); *H04L 41/20* (2013.01); *H04L 43/04* (2013.01); *H04L 43/0876* (2013.01); *H04L 43/10* (2013.01); *H04L 43/50* (2013.01); *H04L 47/125* (2013.01)

(58) Field of Classification Search
CPC ..... H04L 43/0876; H04L 43/01; H04L 43/50; H04L 47/125
USPC ........................................................ 709/223
See application file for complete search history.

(56) References Cited

U.S. PATENT DOCUMENTS

| | | |
|---|---|---|
| 8,929,936 B2 | 1/2015 | Mody |
| 8,948,810 B2 | 2/2015 | Centoza |
| 8,989,740 B2 | 3/2015 | Economy |
| 10,051,533 B2 | 8/2018 | Fitzpatrick |
| 10,085,198 B2 | 9/2018 | Kavoussi |
| 10,785,143 B1* | 9/2020 | Morris .................... H04L 45/04 |
| 2005/0198247 A1* | 9/2005 | Perry .................... H04L 7/0008 709/223 |
| 2009/0094521 A1* | 4/2009 | Hung .................. H04L 41/0846 715/736 |
| 2015/0280995 A1 | 10/2015 | Centoza |
| 2017/0164274 A1 | 6/2017 | Petrescu |
| 2017/0230425 A1* | 8/2017 | Knjazihhin ............. H04L 41/28 |
| 2017/0300354 A1* | 10/2017 | Dalai .................. H04L 41/0856 |
| 2018/0077051 A1* | 3/2018 | Nainar .................. H04L 45/745 |
| 2018/0287934 A1* | 10/2018 | Wang .................. H04L 12/4625 |
| 2018/0324874 A1 | 11/2018 | Wu |
| 2018/0359146 A1* | 12/2018 | Bevemyr ................ H04L 41/08 |
| 2020/0162319 A1* | 5/2020 | Szigeti .................. H04L 41/084 |
| 2020/0162589 A1* | 5/2020 | Vijayadharan .......... H04L 69/22 |
| 2020/0162917 A1* | 5/2020 | Anantha ............. H04L 63/0807 |

OTHER PUBLICATIONS

Mohamed et al., "An Intelligent Network Selection Strategy Based on Madm Methods in Heterogeneous Networks", International Journal of Wireless & Mobile Networks (IJWMN) vol. 4, No. 1, Feb. 2012, 14 pages.

Pease, Roland, "Smarter networks for smarter phones", Nov. 18, 2014, Copyright © 2019 BBC, 17 pages, <http://www.bbc.com/future/story/20130221-smart-networks-for-smartphones>.

* cited by examiner

DYNAMIC NETWORK MANAGEMENT BASED ON USER, DEVICE, APPLICATION, AND NETWORK CHARACTERISTICS

BACKGROUND

The present invention relates generally to the field of network management and more particularly to dynamically selecting an optimal network.

Network traffic measurement is the process of measuring the amount and type of traffic on a particular network. Network performance is measured using either active or passive techniques. Various software tools are available to measure network traffic. Some tools measure traffic by sniffing packets and others use Simple Network Management Protocol (SNMP) or other local agents to measure bandwidth utilization on individual machines, servers, nodes, and routers. Inline network traffic measurement tools generally 'sit' between the local area network (LAN) and the exit point of the LAN, generally the wide area network (WAN) or Internet router. In most cases the tool would operate as a bridge on the network so that the tool is undetectable by users.

Ping is a computer network administration software utility used to test the reachability of a host on an Internet Protocol (IP) network. Ping tools are available for virtually all operating systems that have networking capability, including most embedded network administration software. Ping measures the round-trip (e.g., end-to-end) time for messages sent from the originating host to a destination computer that are echoed back to the source. Ping operates by sending Internet Control Message Protocol (ICMP) echo request packets to the target host and waiting for an ICMP echo reply. The program reports errors, packet loss, and a statistical summary of the results, typically including the minimum, maximum, the mean round-trip times, and standard deviation of the mean.

SUMMARY

Embodiments of the present invention disclose a method, a computer program product, and a system for dynamic network management based on user, device, application, and predicted network characteristics. The method includes one or more computer processors identifying one or more network interfaces. The one or more computer processors determine one or more network performance parameters and capabilities of the identified network interfaces. The one or more computer processors determine a highest ranked network connection based on the determined network performance parameters and capabilities of the identified network interfaces. The one or more computer processors generate one or more network templates based on the determined highest ranked network connection and associated network performance parameters. The one or more computer processors apply the one or more generated network templates to a plurality of entities and devices.

DETAILED DESCRIPTION

Frequently, it is essential that a user connect/access specific networks to ensure a stable connection and minimum standards of network security, quality, price, and reliability. Different user, devices, and applications require different network parameters. In an example situation, such as generic video streaming, a user may require a low price per connection or data unit transferred over network reliability or security. Generally, it is difficult for a user, application, or device to determine what network interface, service provider and associated network to utilize, without support, information, or assistance from network administrators or service providers. Said administrators and service providers have information and statistics regarding network conditions, anticipated performance, and security requirements necessary in determining an optimal network or route path. Additionally, it is considerably difficult to dynamically change a network or routing path based on changes to routers, switches, paths, servers, and networks. Traditionally, users manually switch to another network interface (e.g., ethernet, wireless, etc.) anticipating that said network interface and associated network includes sufficient performance, stability, and security procedures for the utilized application. Furthermore, network stability issues create substantial amounts of data and computational overhead. For example, network instability can create redundant three-way transmission control protocol (TCP) handshakes when a connection is timed out due to high latency or packet transmission errors. Additionally, substantial amounts of traffic, memory, and processor utilization is incurred when transmitted packets are corrupted or fail to arrive due to network changes causing network instability. Said issues are mitigated by the dynamic network management system as referenced in the Figures.

Embodiments of the present invention recognize that dynamic network management is improved by identifying, assessing, and generating network parameters and templates based on one or more trained cognitive models. In an embodiment of the present invention, network templates are created and applied to devices and applications as a user utilizes or plans to utilize said devices and applications. In another embodiment of the present invention, network templates can be dynamically modified and selectively applied due to changes in network parameters and characteristics. In yet another embodiment, network templates are applied on a router, switch, or service provider level. Implementation of embodiments of the invention may take a variety of forms, and exemplary implementation details are discussed subsequently with reference to the Figures.

The present invention will now be described in detail with reference to the Figures.

In an embodiment, the user expressly authorizes the present invention to collect, monitor, log, and utilize any data relevant to one or more capabilities of the present invention.

Figure 1:
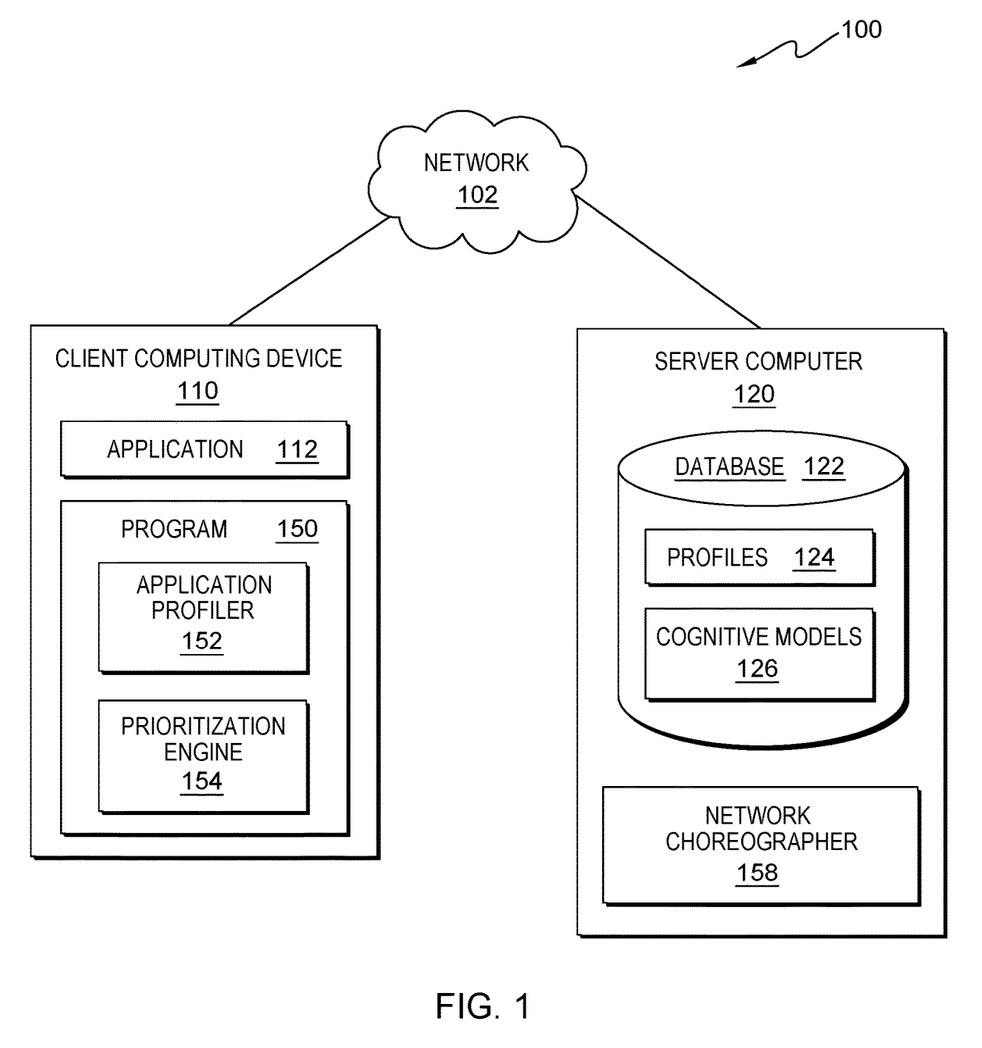
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 110 and server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 110, server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Client computing device 110 may be a web server or any other electronic device or computing system capable of processing program instructions and receiving and sending data. In some embodiments, client computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, client computing device 110 may represent a server computing system utilizing multiple computers as a server system, such as in a cloud computing environment. In general, client computing device 110 is representative of any electronic device or combination of electronic devices capable of executing machine readable program instructions as described in greater detail with regard to FIG. 4, in accordance with embodiments of the present invention. Client computing device 110 contains application 112, program 150, application profiler 152, and prioritization engine 154.

Application 112 is a set of one of more programs designed to carry out the operations for a specific application to assist a user to perform an activity (e.g., word processing programs, spread sheet programs, media players, web browsers, chat programs, etc.). In the depicted embodiment, application 112 resides on client computing device 110 respectively. In another embodiment, application 112 may reside on server computer 120 or on another device (not shown) connected over network 102.

Program 150 is a program for dynamic network management based on user, device, application, and predicted network characteristics. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. Program 150 is depicted and described in further detail with respect to FIG. 2.

In various embodiments, program 150 prompts the user to authorize program 150 to collect, monitor, and log data (i.e., emails, calendar, social media, data logs, application monitoring, network monitoring, general networking access, location metadata, data history, etc.) into database 122, including profiles 124 and cognitive models 126. In an example, the user permits program 150 to access and utilize the metadata of a streaming video application. In an embodiment, the user may opt-in/opt-out for any monitored and/or logged data. In a further embodiment, the user can remove any non-public data at any moment from database 122. For example, the user opts to removes all device profile information from profiles 124 and prevents program 150 from retrieving additional information regarding said device.

Application profiler 152 is a sub program of program 150 that identifies, monitors, and stores application information detailing applications installed, stored, and utilized on a specific user device (e.g., client computing device 110). Responsive to identifying an application, application profiler 152 creates and stores an application profile into profiles 124. Application profiler 152 generates a universally unique identifier (UUID) and associates the created profile with said UUID. In another embodiment, program 150 generates a group unique identifier (GUID) and associates the created profile with said GUID. In various embodiments, application profiler 152 retrieves and stores the system requirements and specifications of the identified applications. Responsive to the created profile, application profiler 152 monitors one or more performance parameters associated with the identified application. In various embodiments, application profiler 152 monitors a plurality of performance parameters and statistics including, but not limited to, CPU, GPU, network, memory, and battery utilization. In this embodiment, application profiler 152 measures and records said performance parameters into a specified application profile.

Prioritization engine 154 is a sub program of program 150 that receives inputs, predictions, profiles, and network templates from network choreographer 158 and ensures that the determined optimal network interface, associated networks, and network traffic is compliant with the considerations, procedures, and requirements of a specified network template. Prioritization engine 154 has user, network, application, or service provider permission to enforce said template on one or more ISP, system, application, or network layer levels. In various embodiments, prioritization engine 154 notifies targeted applications of an enforced network template, allowing said applications the ability to apply traffic shaping, on a per application basis, to ensure application network output stays within the bounds of said network template. In an embodiment, incompliant network traffic may be discarded immediately, marked as incompliant and processed, routed to a compliant network, or left untouched, dependent on the policies, parameters, conditions, and bounds of the applied network template. In another embodiment, incompliant traffic is reshaped into a complaint form (e.g., encapsulated in the required protocol, encrypted with an requisite encryption level, etc.) and redirected to a complaint network interface, associated network, and one or more associated service providers. In various embodiments, prioritization engine 154 may modify a network template based on changes to the utilized application, device, network interfaces, and associated networks. For example, if a network template dictates usage of a particular network interface and associated network which has since became unpractical and/or unavailable (e.g., network changes, hardware failures, pricing changes, etc.), then prioritization engine 154 modifies the enforced network template to balance the requirements of the network template with the current device, application, and/or network conditions.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes database 122, user profiler 156, and network choreographer 158. In another embodiment, sever computer 120 includes one or more instances of and subprograms of program 150. In other embodiments, server computer 120 may contain other applications, databases, programs, etc. which have not been depicted in distributed data processing environment 100. Server computer 120 may include internal and external hardware components, as depicted and described in further detail with respect to FIG. 4.

In the depicted embodiment, database 122 is a repository for data used by program 150 and resides on server computer 120. In another embodiment, database 122 may reside on client computing device 110 or elsewhere within distributed data processing environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150 including a plurality of associated network templates, profiles (user, temporal, geographical, etc.), and relevant metadata. In the depicted embodiment, database 122 contains profiles 124 and cognitive models 126.

In the depicted embodiment, profiles 124 is a repository for a plurality of profiles maintained and utilized by program 150 and resides in database 122. In an embodiment, profiles 124 contains a plurality of different profiles including, but not limited to, network interface, associated networks and service providers, application, device, and user profiles. In a further embodiment, the plurality of profiles includes historical information specific to each profile. For example, an application profile includes historical application utilization and associated statistics and information as detailed below.

A network profile may include network interface information detailing a specific network interface such as broadband interface (e.g., ethernet, optical fiber, twisted pair, coaxial, etc.) or wireless broadband interface (e.g., radio, global system for mobile communications (GSM), code-division multiple access (CDMA), institute of electrical and electronics engineers (IEEE) 802.11/802.16/802.20, etc.). In this embodiment, network information may include technical network interface specifications such as supported network protocols, spectrum frequencies (e.g., cellular technology operating within the 900 MHz and 1800 MHz frequency bands), security protocols (e.g., pre-shared keys, challenge-response, etc.), power consumption statistics (e.g., peak power consumption, average power consumption, etc.), throughput statistics (e.g., error rates, bits per second, latency rates, jitter rate, transmission overhead, upload amount, upload rate, download amount, download rate, etc.), manufacturer details (e.g., model version, manufacturer ids, firmware version ids, related devices, etc.), and supported hardware architectures (personal computer memory card international association (PCMCIA), peripheral component interconnect (PCI), etc.). In another embodiment, a network profile may include multiple network interfaces which may be discrete or aggregated (e.g., network interface controller (NIC) teaming, link bundling, port trunking, channel bonding, etc.). For example, several ethernet interfaces are teamed together, effectively combining said ethernet interfaces into one ethernet interface and increasing the capabilities (e.g., throughput) of said interfaces.

A network profile may, also, include network information detailing a specific network (i.e., service provider, networking path and protocol) such as personal area network (PAN), local area network (LAN), wireless local area network (WLAN), campus area network (CAN), metropolitan area network (MAN), wide area network (WAN), storage-area network (SAN), passive optical local area network (POLAN), enterprise private network (EPN), virtual private network (VPN), and Tor (onion routing). Generally, network information characterizes the network areas and routes that network requests and responses may utilize. In this embodiment, network information may include supported/allowed networking protocols (e.g., TCP/IP, FTP, SSH, etc.) and security protocols. For example, a VPN can utilize any combination of the following protocols: IPSec, L2TP, PPTP, SSL, TLS, OpenVPN, and SSH. In another embodiment, the network profile includes technical specifications such as throughput statistics and supported hardware architectures. In various embodiments, a network profile includes service provider information such as data limits (e.g., max upload and download limits), pricing information (e.g., service contracts, overage penalties, data constraints (e.g., data throttling, prohibited uses, etc.), etc.), network preferences, etc. In another embodiment, the network profile includes pricing information specific to the network, network interface, or service provider. In this embodiment, pricing information includes cost per transaction (e.g., connection attempt, database transaction, etc.), cost per unit of data (e.g., byte, kilobytes, megabytes, etc.), cost per unit of data dependent on temporal and traffic considerations (e.g., cost during peak and non-peak hours, etc.), and cost per associated service provider (e.g., internet service provider (ISP), mobile service provider (MSP), VPN provider, etc.). In an additional embodiment, the network profile includes service provider contracts and user network preferences.

An application profile may include application information detailing a specific application. Said application information may include system requirements (e.g., minimum/suggested central processing unit (CPU), graphics processing unit (GPU), memory, network interfaces, networks, security requirements, etc.), performance parameters (e.g., average CPU, memory, network, battery utilization, etc.), temporal parameters (e.g., utilization durations, time period utilization, etc.), utilized programming languages, and generic application descriptions (e.g., application category, purpose, related fields, etc.). In another embodiment, an application profile may link or contain associated network interface profiles, network profiles, and devices. For example, a chat application frequently utilizes an ethernet connection and requires a VPN. In this example, the application profile for said chat application includes links to the information contained in an associated ethernet network interface profile and network (i.e., VPN) profile.

A device profile may include device information detailing a specific device (e.g., client computing device 110, etc.). Said device information may include technical specifications regarding available hardware such as CPU, GPU, memory, hard drive capacities, and network interfaces In another embodiment, device information includes technical capabilities such as operating system, network protocols, network standards, utilization parameters (e.g., device utilization duration, temporal constraints, etc.), consumption statistics, throughput statistics, manufacturer details, and supported hardware architectures. In another embodiment, consumption statistics include the average amount of network data utilized. In this embodiment, the data consumption statistics are partitioned into download/upload or downstream/upstream subsets. In various embodiments, the information contained in a device profile is partitioned into subsets such as a temporal period subset. For example, a temporal subset may detail the average daily amount of data or the average monthly amount of download/upload of a device. In a further embodiment, a device profile may link or contain associated network interface, network, and application profiles. For example, for a specified user device, a profile is created and contains or links to each network interface, network, and application profile associated (i.e., utilized, run, etc.) with said user device.

A user profile includes information specific to an individual user. Said information may include user preferences (e.g., preferred networks, network interfaces, security protocols, cost constraints, etc.), geographical information (e.g., country, region, city, town, etc.), service subscription information (e.g., internet service contracts, stipulations, etc.), related social media information, user calendar or scheduling information (e.g., future meetings, application and device utilization, etc.), and performance preferences (e.g., minimum/optimal throughput, acceptable error rates, security requirements, etc.). In another embodiment, a user profile may link or contain associated network interfaces, networks, applications, and device profiles. In this embodiment, the user profile includes one or more links to associated devices (i.e., devices that the user utilizes) which in turn may contain links to associated application profiles which may contain links to associated network profiles.

In an embodiment, one or more profiles are organized in dynamic, categorical (temporal, geographical (e.g., regional, city, country, state, etc.), service provider based (e.g., ISPs, hosting providers, etc.) sets that allow a high-level representation of multiple profiles. In this embodiment, the set may include one or more categories of profiles (e.g., network interface, network, application, and device). In an additional embodiment, a temporal set of profiles include all profiles utilized during a specific time period. For example, a temporal set of device profiles includes all devices utilized during from 8:00 PM to 9:00 PM. In another embodiment, a geographical set of profiles include all the applications utilized in a specific geographical area. For example, a geographical set includes all applications utilized in the city of Chicago. In various embodiments, profiles are organized into a plurality of sets and subsets such as regional profiles (profiles that encompass all profiles in a given geographical area). For example, a regional subset of application profiles includes all application profiles utilized by users in a specific region or geographical area. In another embodiment, said profiles may contain links or associations to similar or related profiles.

Cognitive models 126 includes one or more cognitive models predicting a plurality of predictive information by utilizing deep learning techniques. In an embodiment, predictive information includes one or more predictions based on one or more profiles contained within profiles 124. In this embodiment, said predictive information includes predicted future user events such as device, application, network, and network interface utilizations. For example, cognitive models 126 predicts that the user will utilize a video chat application for one hour, Friday night, utilizing a mobile phone and the associated mobile service provider. In this embodiment, cognitive models 126 utilizes the historical information contained in profiles 124 to calculate and predict said event (e.g., application use). In various embodiments, cognitive models 126 calculates user specific predictions regarding what network interfaces, networks, applications, and devices a user may utilize at a future date and time. The predictions may include temporal predictions (e.g., the user will utilize a specific application at a specific time), geographical predictions, predicted user device (e.g., client computing devices), predicted network, predicted network interface, associated consumption predictions (e.g., power, data, system resources etc.), predicted security requirements, and predicted related costs (e.g., transactional, system, and service based costs). For example, cognitive models 126 predicts that a user will utilize a VPN to access confidential documents in a work network utilizing ethernet interface located on a work laptop of the user. In this example, cognitive models 126 predicts how much data will be consumed, what the throughput will be, and when the user will likely utilize the predicted application.

In an embodiment, cognitive models 126 utilizes machine learning algorithms and models (e.g., multilayer perceptron, support vector machine (SVM), Bayes network, decision trees, logistic regression, neural networks, etc.) that can be trained with supervised and/or unsupervised methods. In an embodiment, cognitive models 126 utilizes a multilayer perceptron (MLP) trained using supervised training methods. MLP is advantageous over conventional learning techniques because the training is fast, thus saving computing time and resources. In addition, MLP is an effective method for correlating different types of features from diverging and distinct data. In an embodiment, cognitive models 126 utilizes associated independent classification layers with both supervised and unsupervised methods. In various embodiments, the models contained within cognitive models 126 are recurrent neural networks. In another embodiment, cognitive models 126 contains multiple, connected, hierarchical cognitive models. In this embodiment, each prediction category (i.e., user, device, application, network, network interface, etc.) will have a respective cognitive model, generating predictions for a specific category. Additionally, each model is structured hierarchically wherein each model output (e.g., prediction) is fed into the input layer of the subsequent model. For example, when cognitive models 126 predicts a future event (e.g., predicted that the user will utilize an application, device, network, network interface in the future) for a specified user, program 150 inputs the predicted event into a subsequent model (e.g., neural network, etc.) allowing program 150 to predict what device the user will utilize, associated network conditions and parameters.

Cognitive models 126 predicts one or more future events (e.g., device, application, network, network interface utilization) by considering different features, available as structured or unstructured data, and applying relative weights. Program 150 feeds a vectorized training set of feature data to cognitive models 126. In an embodiment, feature data includes the data detailed in profile 124 (e.g., event statistics, associated metadata, linked profiles, relevant network simulations, etc.). In various embodiments, the data is labeled with a specified event enabling cognitive models 126 to learn what features (e.g., network features, variables, conditions, parameters, etc.) are correlated to a specific event, prior to use. Cognitive models 126 utilizes training and testing sets to train the one or more models. The training and testing sets include plurality of features associated with historical events, network templates, profiles, and associated information/statistics. Cognitive models 126 learns from the training set of data to distinguish between likely and unlikely events (e.g., application predictions, device predictions, optimal network determinations, etc.). Once trained, cognitive models 126 can assign a weight or probability to the occurrence of an event and the likelihood that a predicted network is optimal based on the data aggregated by program 150. The training of cognitive models 126 is depicted and described in further detail with respect to FIG. 2.

User profiler 156 is a sub program of program 150 that identifies, monitors, retrieves, and stores relevant user emails, relevant social media instances, and scheduled user events. User profiler 156 generates a UUID and associates the created profile with said UUID. In another embodiment, user profiler 156 generates a GUID and associates the created profile with said GUID. In an embodiment, user profiler 156 utilizes natural language processing (NLP) techniques (i.e., sentence splitting, tokenization, POS tagging, chunking, dependency parsing, anaphora resolution, etc.) to parse the social media, emails, and schedules to identify future events (e.g., scheduled application usage). For example, the user emails "I have an important webcast with production tomorrow at 10:00 AM" to a coworker. In this example, program 150 determines that the user will utilize a webcast application the next day at 10:00 AM. This determined future event, along with associated device, application, user, and network interface information are inputted into one or more cognitive models to determine optimal network and connection settings/parameters. In an embodiment, user profiler 156 links or stores into a specified user profile historical device, application, network interface, and network utilization associated with a user. In another embodiment, user profiler 156 monitors and records the geographical location of the user associated with identified network, application, and device utilization. For example, the user frequently is located in a dormitory utilizing a campus network and a specific wireless network interface to access campus research servers.

Network choreographer 158 is a sub program of program 150 that creates, modifies, maintains, and stores a plurality of network templates. In an embodiment, network templates are created based on a plurality of characteristics and scopes including, but not limited to, user location, device, user profile (i.e., user preferences, parameters, requirements, scheduled events, etc.), application, and network. In one embodiment, network templates include configuration files, system and application settings/preferences, IP routing tables, firewall settings, and router configuration files and settings which dictate, manage, apply, force, constrain one or more devices and/or applications based on optimized and preferred networks, nodes, servers, and routing paths. In an embodiment, network choreographer 158 can adaptively modify existing network templates based on changes to one or more profiles stored in profiles 124. For example, if a user ceases utilizing or removes a user device then network choreographer 158 modifies and adjusts any network templates associated with said user, device, and application. In various embodiments, network templates are applied on a per device, application, and/or network interface basis. For example, if a user frequently views streaming video on a mobile device, then said user downloads a streaming video network template applying an optimal network and routing path. In various embodiments, users, automatically download and apply network templates to one or more applications, network interfaces, and devices. In an embodiment, network templates are pushed to user devices by a service provider. For example, a mobile service provider pushes a network template to all users that require high network security (e.g., specific network protocol such as SSH or SSL), forcing the devices of said users to encrypt and randomly select intermediate nodes while transferring data on the network of the mobile service provider.

Figure 2:
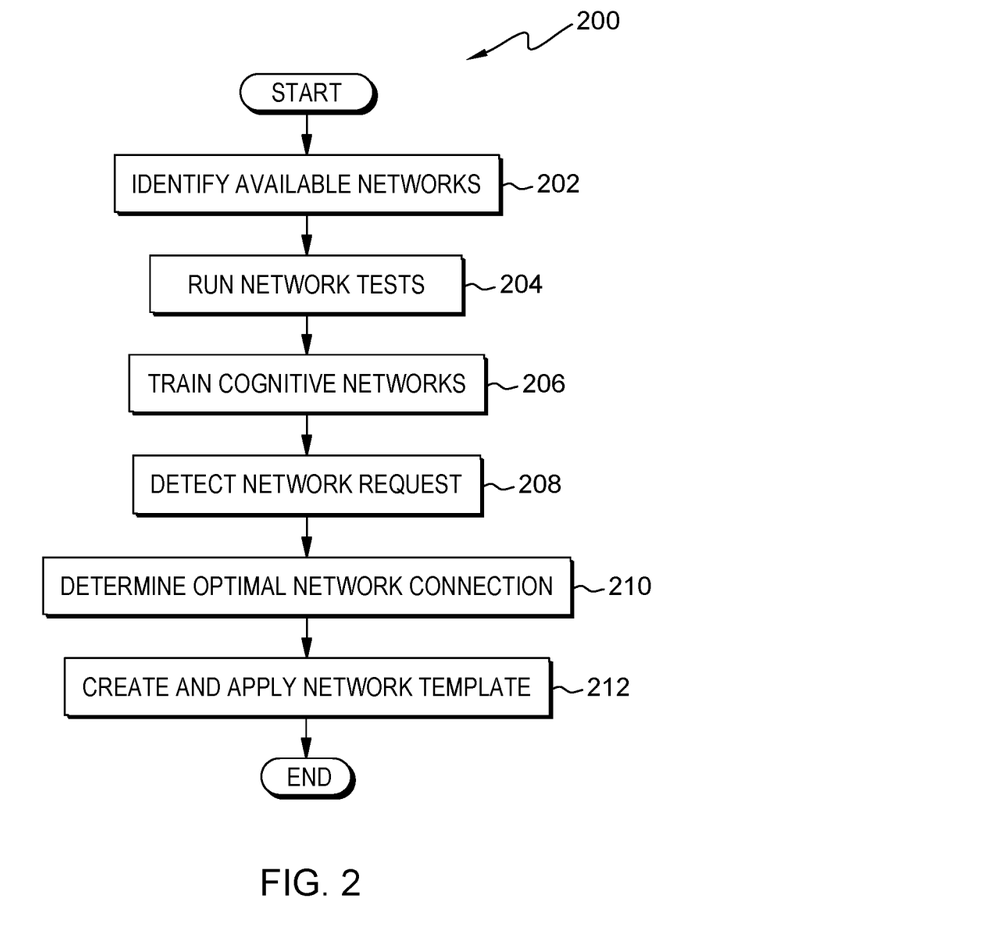
FIG. 2 is a flowchart depicting operational steps of a network management program, on a server computer within the data processing environment of FIG. 1, for dynamic network management based on user, device, application, and predicted network characteristics, in accordance with an embodiment of the present invention.

FIG. 2 is a flowchart depicting operational steps of program 150 for dynamic network management based on user, device, application, and predicted network characteristics, in accordance with one or more embodiments of the present invention. Implementation of the flowchart may take a variety of forms.

Program 150 identifies available networks (step 202). Program 150 identifies, probes, and determines the technical and performance parameters, details, statistics of the network interfaces and associated networks available to a specific device (e.g., client computing device 110, intermediate node, proxy servers, etc.). In an embodiment, program 150 utilizes the operating system of a device to identify all available network interfaces. In this embodiment, program 150 activates an operating system call to return all available network interfaces. In another embodiment, program 150 iterates through each hardware unit on a device, conducting network interface tests to identify said unit as a network interface. Responsive to identifying a network interface, a network interface profile is created and stored within profiles 124. In an embodiment, program 150 utilizes subprograms application profiler 152 and/or user profiler 156 to create, modify, and store one or more network interface profiles in associated with a user, application, and/or device. Program 150 generates a UUID and associates the created profile with said UUID. In an embodiment, program 150 generates a GUID and associates the created profile with said GUID. The GUID allows for a plurality of network interface profiles to be group into related sets such as device sets, geographical sets, and network sets. Program 150 retrieves and stores associated and related manufacturer technical details and information.

Program 150 runs network tests (step 204). Responsive to a created, stored, and retrieved network interface profile, program 150 runs a plurality of intermittent network tests to determine the baseline performance parameters and statistics of the network interface such as average error rates, latency rates, transmission overhead, upload rate, and download rate. In an embodiment, program 150 utilizes subprograms application profiler 152 and/or user profiler 156 to run and store the results from one or more network tests. In another embodiment, program 150 utilizes throughput tests to measure, determine, and store the numbers of data units delivered per time unit. In this embodiment, program 150 may store the results of the throughput test in bps (bits per second), kbps (kilobits per second), etc. In another embodiment, program 150 utilizes latency tests to measure, determine, and store the minimum propagation time due to distance, number of intermediate nodes/networks, and packet queuing. In this embodiment, program 150 may store said results in milliseconds (ms). In another embodiment, program 150 utilizes jitter tests to measure, determine, and store the variation in latency as measured in the variability over time of the end-to-end delay. In this embodiment, program 150 may store said jitter results as a jitter rate. In another embodiment, program 150 utilizes error rate tests to measure, determine, and store the number of transferred bits that have been altered due to noise, interferences, distortion, or bit synchronization errors. In this embodiment, program 150 may store said error results in bit error rate (BER) or bit error probability. In an additional embodiment, program 150 monitors and records the power consumption statistics of the network interface. In various embodiments, program 150 incorporates pricing information specific to the tested network such as cost per transaction, cost per unit of data, cost per unit of data dependent on existing condition (e.g., cost during peak and non-peak hours, etc.). The aforementioned tests are stored within the respective network interface profiles stored within profiles 124.

Program 150 runs multiple variations of the above detailed network tests differentiated by alterations to intermediate servers, nodes, and the endpoint/destination. For example, program 150 initiates a set of localized network tests with the endpoint designated as a local server or network node. In a further example, program 150 initiates another set of network tests designating the first server or node of the network as the endpoint. In a final example, program 150 initiates a set of network tests designating a full end-to-end test, tracing the entire route between a user device (e.g., client computing device 110) and an external target server. In an embodiment, program 150 will continuously test and monitor an identified network interface. In another embodiment, program 150 schedules network tests to be run at predefined or determined intervals. For example, program 150 schedules network tests to be initiated every hour or every day. In various embodiments, program 150 initiates network tests responsive to detecting a network request from a user or upstream server or node. In this embodiment, network tests can be initiated by a client computing device or by an intermediate node, proxy, or server endpoint/destination. In other embodiments, program 150 initiates network tests downstream (e.g., tests are conducted from a service provider system or server down to a user). In yet another embodiment, program 150 subdivides one or more network interfaces and associated networks into one or more subnetworks, allowing program 150 to test and capture statistics regarding said subnetworks. In various embodiments, program 150 splits one or more test payloads (e.g., sets of associated packets or data streams) and transmits said split payloads through one or more network interfaces, associated networks, and service providers. In this embodiment, data (e.g., packets) is separated, transmitted, and then reassembled at an intermediate/destination computer or server allowing a device or application to utilize one or more network interfaces, associated networks, and service providers.

Program 150 trains cognitive networks (step 206). Program 150 retrieves relevant historical profiles from profiles 124 based on the results of the network tests, as described in step 204. In an embodiment, program 150 retrieves profiles from profiles 124 that have similar or relevant profile information to the returned results of the network tests. For example, program 150 retrieves profiles that have the same or similar device hardware (e.g., network interfaces, system capabilities, available networks, etc.) as the identified network interfaces and associated networks. In another embodiment, program 150 retrieves the user profile associated with the user. In this embodiment, program 150 retrieves similar and relevant user profiles based on similar network parameters, preferences, and utilized applications. Program 150 can process each profile based on a determined feature set and/or determined application/device scopes. For example, if the feature set is based on a specific network interface, then program 150 includes profiles that include said network interface or an equivalent hardware unit. In yet another embodiment, program 150 non-deterministically divides the processed sets into training sets and into test sets. In a further embodiment, program 150 attaches a user response or user preference to each historical profile as a label. In another embodiment, program 150 attaches the network results (e.g., targeted performance metric, minimum security parameters, etc.) to each historical profile as a label. In an embodiment, program 150 utilizes featuring scaling techniques (e.g., rescaling, mean normalization, etc.) to vectorize and normalize numerical feature (e.g., historical profiles) sets.

Program 150 can train one or more cognitive models contained in cognitive models 126 by feeding processed vectors. In an embodiment, program 150 initializes one or more cognitive models with randomly generated weights. In an alternative embodiment, program 150 initializes cognitive models 126 with weights calculated from user-based network templates and/or user preferences contained in a user profile. For example, if the user utilizes an application that requires a specific high security network, then program 150 weights any non-compliant security network in such a matter that said network is not considered. In another embodiment, program 150 weights specific networks based on network preferences located into one or more device, user, application and/or network profiles. In the depicted embodiment, cognitive models 126 is represented as multiple interconnected hierarchical recurrent neural networks. In alternative embodiments, the one or more cognitive models contained in cognitive models 126 may be represented as simple neural networks or a specialized neural networks such as Markov chains, perceptron, deep feed forward (DFF) networks, Boltzmann machines, support vector machines (SVM), neural Turing machines, etc.

Program 150 can utilize processed training sets to perform supervised training of cognitive models 126. As would be recognized by one skilled in the art, supervised training determines the difference between a prediction and a target (i.e., the error), and back-propagates the difference through the layers such that cognitive models 126 "learns". In an embodiment, program 150 determines whether a sufficient accuracy is obtained by utilizing test sets. In another embodiment, program 150 utilizes cross-entropy loss as a loss function to determine the level of accuracy of the model. In this embodiment, program 150 compares the predicted optimal network with the expected optimal network (e.g. route path, intermediate nodes, proxies, servers, etc.). In yet another embodiment, program 150 may utilize the cross-entropy loss value to calculate a network error rate which further denotes the level of accuracy in a predicted optimal network. In this embodiment, program 150 determines sufficient accuracy based on the predicted network error rate generated by cognitive models 126. If the calculated accuracy is insufficient, then program 150 continues with supervised training of cognitive models 126. If the calculated accuracy is sufficient, then program 150 ends the training process. In an embodiment, if the training/testing sets and data are underfitting, then program 150 may utilize network stimulation techniques to model the behavior of an unknown network. In this embodiment, program 150 calculates the interactions between different networks (e.g., routers, nodes, switches, access points, links, servers, etc.) by utilizing discrete event simulation, the modeling of systems in which state variables change at discrete points in time. In another embodiment, program 150 modifies various attributes of a network to assess how the network, network entities, service providers, and protocols behave under different conditions, variables, and environments (e.g., user location, device location, server location, network traffic generated from other users, etc.).

Program 150 detects network request (step 208). In an embodiment, program 150 monitors the operating system of client computing device 110 for the initiation a system network request. In various embodiments, program 150 acts as an inline proxy and/or a transparent proxy 'sitting' in between the client computing device and the destination network and/or server. In this embodiment, all network traffic to and from the client computing device will travel through program 150. In another embodiment, program 150 monitors application activity to determine a network request. In this embodiment, program 150 identifies a requesting application and pauses, delays, or halts the request until an optimal network is calculated, predicted, and applied utilizing a network template. In one embodiment, program 150 retrieves application profiles that are relevant to the identified requesting application. In this embodiment, program 150 retrieves application profiles and application-based network templates from profiles 124 that share similar network, performance, security, hardware requirements, user parameters, and user location. In an additional embodiment, program 150 utilizes prioritization engine 154 to access, modify, and control all network traffic associated with a device, application, and/or user.

Program 150 determines optimal network connection (step 210). Program 150 utilizes the one or more cognitive models stored within cognitive models 126 to calculate the optimal network parameters and settings. In an embodiment, responsive to identifying the network request, requesting application, retrieving historical application, device, network, user profiles, and associated network templates, program 150 processes and vectorizes retrieved information as described in step 206. In an alternative embodiment, program 150 utilizes an application profile trained cognitive model to predict when a user will utilize a specific application and calculate the associated network characteristics and conditions based on network simulations and historical profiles contained in profiles 124. In an embodiment, program 150 determines an network connection as optimal when the network connection has the greatest probability of satisfying the network requirements of the user based on a plurality of factors including, but not limited to, required network security standards and protocols, minimum ping, minimum network throughput, proxies, intermediate servers, service providers, and associated prices/costs. In another embodiment, the factors are weighted based on level of importance/significance to the user, application, device, or network. For example, significant or required factors are weighted more heavily than less significant or optional factors.

Cognitive models 126 process the identified, retrieved profiles and templates and predict optimal network parameters. Cognitive models 126 assesses the profile vectors and templates by utilizing the training set of labelled network and template pairs (e.g. profiles 124) as described in step 206, to assign weights to the various features (e.g., network parameters, settings, performance constraints, etc.). Responsive to said training, program 150 can utilize cognitive models 126, and the learned weights of the model, to generate one or more application and device compatible network parameters, routes, preferred service providers, and settings. In various embodiments, creates and maintains multiple cognitive models, each dedicated to a calculation or prediction specific to a user, device, application, network interface, associated network, and service provider. In a further embodiment, the output of a cognitive model is utilized as an input for a subsequent cognitive model. For example, responsive to an application profile trained cognitive model outputting a result, program 150 inputs said result as a new input to a network profile trained cognitive model. Program 150 feeds the vectorized retrieved information into one or more cognitive models contained in cognitive models 126.

Program 150 utilizes the trained model and the learned weights and layers of the model to predict optimal network parameters (e.g., one or more network interfaces, service providers, associated networks) and generate one or network templates. In one embodiment, utilizing the output of cognitive models 126, program 150 generates a series of compliant network parameters, settings, routes, and associated probabilities. Said series of probabilities denote the chance that the predicted network parameters are optimal. In an embodiment, program 150 selects the most probable network parameters (e.g., the network or route with the highest attached probability). In this embodiment, program 150 ranks the determined network connections based on probability and selects the highest ranked (e.g., optimal) network connection, settings, or parameters. In another embodiment, program 150 prompts the user with the top predicted network parameters and allows the user to select the preferred network parameters. In a further embodiment, program 150 prompts the user if no predicted network parameters meet or exceed a predetermined probability threshold. For example, if the probability threshold is set at 50% and no predicted network have a probability greater than or equal to 50%, then program 150 prompts the user with the list of predicted networks, service providers, and associated parameters. In various embodiments, program 150 halts the feeding process into cognitive models 126 if the predicted probability of all the networks falls under a predetermined probability threshold level such as 50%.

Program 150 creates and applies the network template (step 212). Responsive to calculating and predicting an optimal network or route pathing, program 150 creates a network template or updates an historical network template based on the calculated and predicted optimal network settings and parameters. In one embodiment, network templates include all required security protocols, networks, service providers, pricing information, and network interfaces for a specified device, user, or application. In another embodiment, network templates include one or more aggregated or packet splitting network interfaces, and associated service providers and networks. In a further embodiment, network templates detail the required network paths, routes, and intermediate servers and nodes, all inbound/outbound packets must conform to. In an embodiment, program 150 stores said created network template into profiles 124 and associates the network template to relevant profiles contained within. For example, if program 150 creates a new network template, specific to particular device, then program 150 stores and applies said network template to any available associated device, applications, and network interfaces.

In another embodiment, program 150 stores any created or modified cognitive model, network template, and/or profile (e.g., application, device, network profiles, etc.) into database 122. In various embodiment, program 150 retrieves a related, similar, or associated historical network template and modifies said template to conform with the calculated and predicted network parameters and settings. In one embodiment, program 150 utilizes network choreographer 158 to manage, maintain, and enforce the applied network template. In another embodiment, program 150 utilizes prioritization engine 154, as detailed above, to continuously monitor and modify an applied network template based on the current parameters and status of a device, user, application, network interface, service provider, and associated network.

Figure 3:
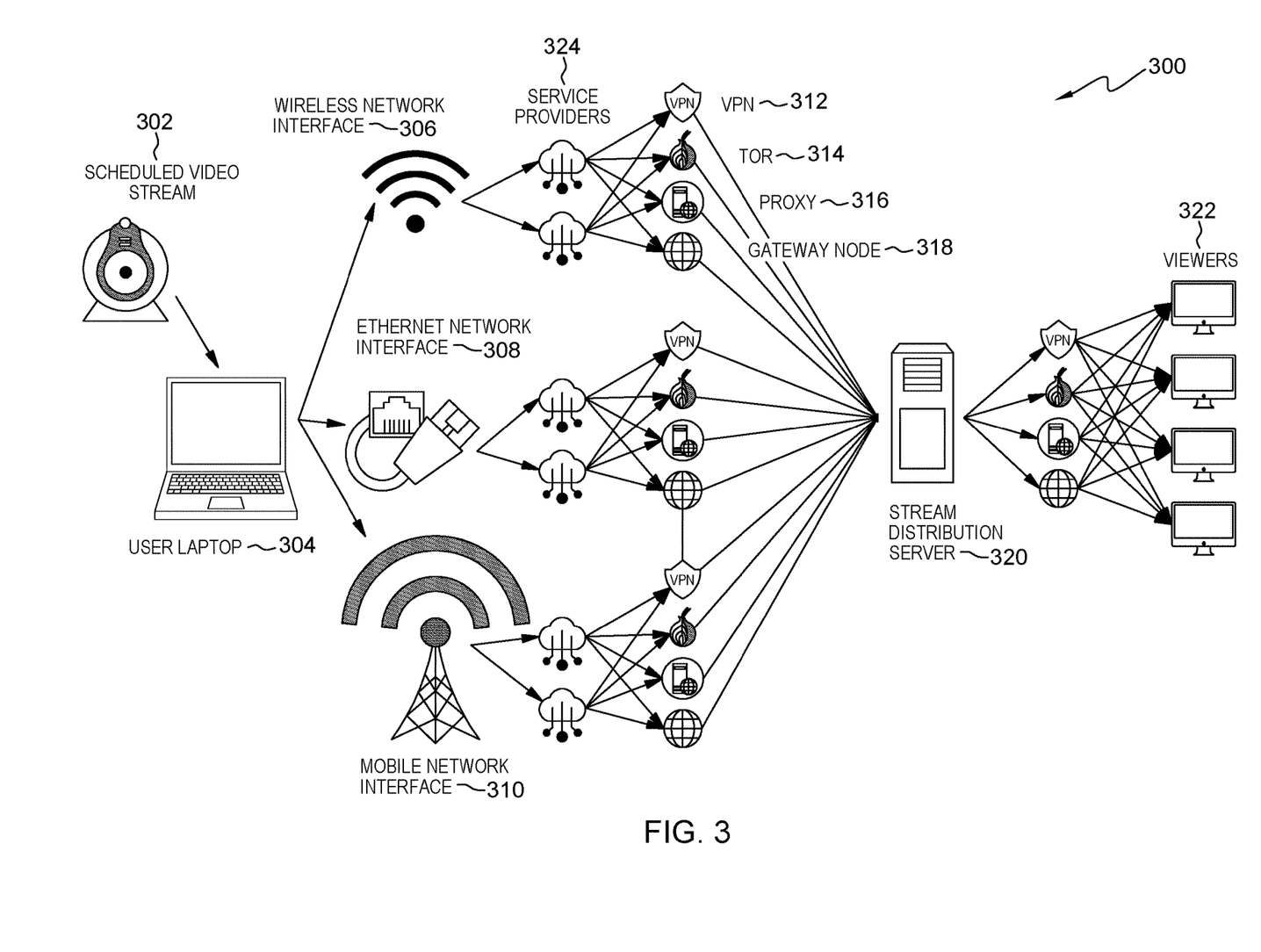
FIG. 3 is an example embodiment of the steps of flowchart 200, in accordance with an embodiment of the present invention.

FIG. 3 depicts an example embodiment of the steps of flowchart 200 including schedule video stream 302, a scheduled application use, user laptop 304 (a client computing device), wireless network interface 306 (an available wireless network interface), ethernet network interface 308 (an available wired network interface), mobile network interface 310 (an available mobile network interface), VPN 312 (one or more accessible virtual private networks), TOR 314 (one or more accessible TOR networks), proxy 316 (one or more accessible proxy servers), gateway nodes 318 (a plurality of standard ISP gateway nodes), stream distribution server 320 (a video stream distribution server), viewers 322 (a plurality of video stream viewers), and service providers 324 (a plurality of accessible service providers).

In a detailed example of flowchart 200, user Luca (hereinafter Luca) schedules video stream (e.g., scheduled video stream 302), via a calendar application (not depicted). Luca plans to host a video stream utilizing a work laptop with several hundred viewers connecting to said stream via stream distribution server 320. Program 150 retrieves the calendar of Luca and determines that Luca will utilize a specific video capture application in order to stream Monday at 10:00 AM. Program 150 utilizes historical application and device profiles to predict one or more user devices that Luca may utilize to cast schedule video stream 302 (e.g., user laptop 304). Responsive to determining the one or more user devices, program 150 identifies the available network interfaces, associated networks, service providers, and associated network information, profiles, parameters, and metadata for each determined user device.

Program 150 runs one or more upstream and downstream network tests, calculating one or more network parameters, performance, and reliability metrics for each identified network interface, associated networks, and associated service providers. Specifically, program 150 runs one or more network tests utilizing the identified network interfaces (e.g., wireless network interface 306, ethernet network interface 308, and mobile network interface 310), wherein program 150 runs one or more network tests utilizing one or more available service providers (e.g., service providers 324), wherein program 150 runs one or more networks tests for each associated network (e.g., VPN 312, TOR 314, proxy 316, and gateway node 318). In the depicted example, program 150 subdivides and conducts one or more network tests on one or more upstream network paths and routes to stream distribution server 320. Further, program 150 conducts one or more network tests on one or more downstream network routes from stream distribution server 320 to the one or more viewers in viewers 322. Additionally, program 150 runs one or more network tests aggregating network interfaces and splitting/transmitting data and packets via discrete network interfaces, networks, and service providers.

Responsive to the completed and stored network tests, program 150 retrieves historical information and profiles, from database 122 and profiles 124, associated with the scheduled stream and similar historical streams and network utilizations by Luca and the plurality of viewers in viewers 322. The information retrieved includes historical user, device, application, and network profiles. Furthermore, program 150 aggregates multiple historical profiles based on the geolocation and user preferences. Program 150 processes, vectorizes, and creates multiple sets of training and testing sets based on the conducted tests, retrieved historical information and profiles. Program 150, then, utilizes the training and testing sets to train one or more models included in cognitive models 126. Program 150 adjusts the weights of the model based on network conditions, user preferences, application requirements, and available device hardware (e.g., available network interfaces). Program 150 utilizes the one or more cognitive models to determine the optimal network based on user preferences, device parameters, and application requirements along with historical, existing, and predicted network conditions. In the depicted example, program 150 determines that high network security is not a requirement along with the predicted cost of the transmission. Program 150 determines that high upload throughout and latency are user and application priorities, due to the nature of video streaming and based on retrieved historical profiles. In the depicted example, program 150 determines that an optimal network/route includes ethernet network interface 308, one service provider contained within service providers 324, and a network including gateway node 318.

Responsive to an optimal network determination, program 150 creates one or more network templates that include optimal network settings, parameters, routes, paths, network interfaces, service providers. Program 150 applies the one or more network templates to the device (e.g., user laptop 304) and/or application (e.g., scheduled video stream 302). Once Luca initiates scheduled video stream 302 and program 150 detects the network request (e.g., network utilization), the applied network template mandates the device and/or application to conform with the standards and requirements contained within the network template. Program 150 uploads said network template to an external repository for future use.

Figure 4:
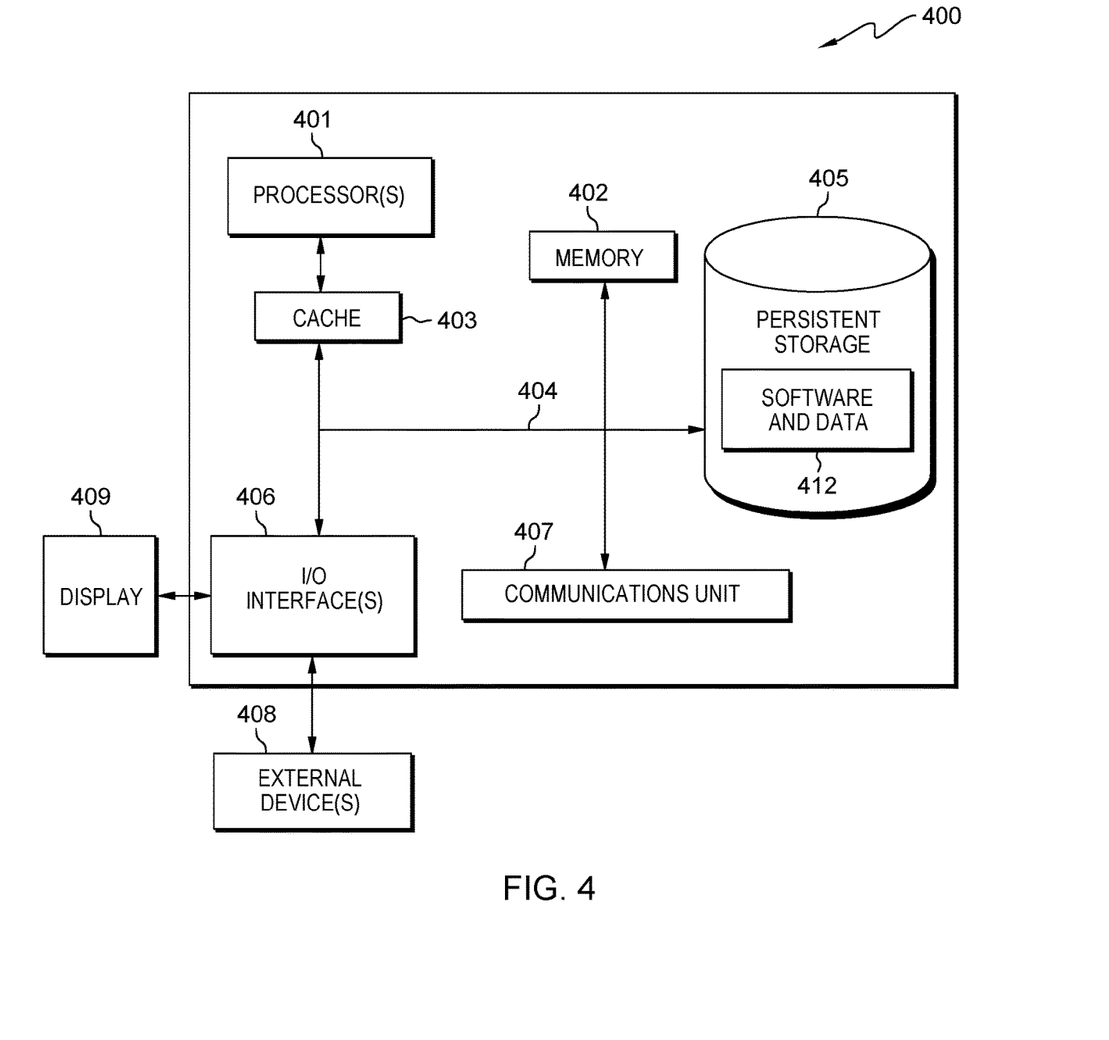
FIG. 4 is a block diagram of components of the server computer executing the network management program, in accordance with an embodiment of the present invention.

FIG. 4 depicts a block diagram of components of client computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to client computing device 110. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   creating, by one or more computer processors, a user profile associated with a user storing one or more user emails, one or more social media instances, and one or more scheduled user events;
   determining, by one or more computer processors, one or more networks interfaces associated with the user profile;
   determining, by one or more computer processors, one or more network performance parameters and capabilities of one or more determined network interfaces;
   determining, by one or more computer processors, a highest ranked network connection based on the determined network performance parameters and capabilities of the one or more identified network interfaces, wherein network performance parameters and capabilities incorporate cost per unit of data;
   generating, by one or more computer processors, one or more network templates based on the determined highest ranked network connection and associated network performance parameters; and
   applying, by one or more computer processors, the one or more generated network templates to a plurality of entities and devices.

2. The method of claim 1, wherein applying the network templates to the plurality of entities and devices, further comprises:
   redirecting, by one or more computer processors, incompliant network traffic to an applied network template parameter selected from the following group: network interfaces, associated networks, protocols, and service providers.

3. The method of claim 1, further comprises:
   modifying, one or more computer processors, dynamically, one or more generated network templates by a network choreographer based on one or more changes to group consisting of associated user profiles, application profiles, device profiles, network profiles, current network conditions, and predicted network conditions.

4. The method of claim 1, wherein determining the highest ranked network connection based on the determined network performance parameters and capabilities of the identified network interfaces, further comprises:
   detecting, by one or more computer processors, one or more network requests based on the identified network interfaces;
   identifying, by one or more computer processors, one or more applications requesting the one or more detected network requests;
   identifying, by one or more computer processors, one or more users associated with the detected network request;
   identifying, by one or more computer processors, one or more devices associated with the detected network request;
   identifying, by one or more computer processors, one or more service providers associated with the one or more network interfaces;
   retrieving, by one or more computer processors, one or more historical profiles based on the identified one or more devices, applications, devices, service providers, and users;
   training, by one or more computer processors, one or more cognitive models based on the retrieved device profiles, application profiles, user profiles, associated service providers, and associated data transmission costs; and
   determining, by one or more computer processors, an optimal network connection based on one or more calculations by the trained one or more cognitive models.

5. The method of claim 1, further comprises:
retrieving, by one or more computer processors, one or more historical profiles;
retrieving, by one or more computer processors, one or more network templates;
adjusting, by one or more computer processors, one or more weights in a cognitive model based on preferences and settings contained with the one or more historical profiles and network templates;
feeding, by one or more computer processors, the one or more identified network requests into the cognitive model, wherein the cognitive model utilizes one or more historical profiles and network templates, wherein the one or more historical profiles include historical user profiles, application profiles, device profiles, network interface profiles, and associated network profiles;
predicting, by one or more computer processors, application utilization based on one or more cognitive model calculations;
predicting, by one or more computer processors, device utilization based on one or more calculations by the cognitive model;
predicting, by one or more computer processors, one or more network conditions of the predicted application based on one or more calculations by the cognitive model; and
determining, by one or more computer processors, an optimal network connection based on current and predicted network conditions of the predicted application and the predicted device.

6. The method of claim 1, wherein determining one or more network performance and capabilities of the identified network interfaces further comprises:
retrieving, by one or more computer processors, one or more historically relevant device and network interface profiles;
aggregating, by one or more computer processors, one or more service provider network connections associated with the identified network interfaces; and
conducting, by one or more computer processors, one or more intermittent tests to determine end-to-end network performance on the identified network interfaces and associated service provider connections.

7. The method of claim 1, wherein network templates include parameters selected from the following group: security protocols, network preferences, service providers, pricing information, contracts, and policies, network interfaces, aggregated or packet splitting policies, network paths, routes, gateways, intermediate servers, proxies, and nodes.

8. The method of claim 1, wherein the plurality of devices is selected from the following group: applications, user devices, network interfaces, routers, switches, nodes, gateways, and proxies by a network choreographer, wherein the network choreographer transparently monitors, controls, directs, and adjusts network traffic based on the generated network template.

9. A computer program product comprising:
one or more computer readable storage media and program instructions stored on the one or more computer readable storage media, the stored program instructions comprising:
program instructions to create a user profile associated with a user storing one or more scheduled user events;
program instructions to determine one or more networks interfaces associated with the user profile;
program instructions to determine one or more network performance parameters and capabilities of one or more determined network interfaces;
program instructions to determine a highest ranked network connection based on the determined network performance parameters and capabilities of the one or more identified network interfaces, wherein network performance parameters and capabilities incorporate cost per unit of data;
program instructions to generate one or more network templates based on the determined highest ranked network connection and associated network performance parameters; and
program instructions to apply the one or more generated network templates to a plurality of entities and devices.

10. The computer program product of claim 9, wherein applying the network templates to the plurality of entities and devices, further comprises:
program instructions to redirect incompliant network traffic to an applied network template parameter selected from the following group: network interfaces, associated networks, protocols, and service providers.

11. The computer program product of claim 9, further comprises:
program instructions to modify dynamically one or more generated network templates by a network choreographer based on one or more changes to group consisting of associated user profiles, application profiles, device profiles, network profiles, current network conditions, and predicted network conditions.

12. The computer program product of claim 9, wherein determining the highest ranked network connection based on the determined network performance parameters and capabilities of the identified network interfaces, further comprises:
program instructions to detect one or more network requests based on the identified network interfaces;
program instructions to identify one or more applications requesting the one or more detected network requests;
program instructions to identify one or more users associated with the detected network request;
program instructions to identify one or more devices associated with the detected network request;
program instructions to identify one or more service providers associated with the one or more network interfaces;
program instructions to retrieve one or more historical profiles based on the identified one or more devices, applications, devices, service providers, and users;
program instructions to train one or more cognitive models based on the retrieved device profiles, application profiles, user profiles, associated service providers, and associated data transmission costs; and
program instructions to determine an optimal network connection based on one or more calculations by the trained one or more cognitive models.

13. The computer program product of claim 9, further comprises:
program instructions to retrieve one or more historical profiles;
program instructions to retrieve one or more network templates;
program instructions to adjust one or more weights in a cognitive model based on preferences and settings contained with the one or more historical profiles and network templates;

program instructions to feed the one or more identified network requests into the cognitive model, wherein the cognitive model utilizes one or more historical profiles and network templates, wherein the one or more historical profiles include historical user profiles, application profiles, device profiles, network interface profiles, and associated network profiles;

program instructions to predict application utilization based on one or more cognitive model calculations;

program instructions to predict device utilization based on one or more calculations by the cognitive model;

program instructions to predict one or more network conditions of the predicted application based on one or more calculations by the cognitive model; and program instructions to determine an optimal network connection based on current and predicted network conditions of the predicted application and the predicted device.

14. The computer program product of claim 9, wherein determining one or more network performance and capabilities of the identified network interfaces, further comprises:

program instructions to retrieve one or more historically relevant device and network interface profiles;

program instructions to aggregate one or more service provider network connections associated with the identified network interfaces; and program instructions to conduct one or more intermittent tests to determine end-to-end network performance on the identified network interfaces and associated service provider connections.

15. A computer system comprising:

one or more computer processors;

one or more computer readable storage media; and program instructions stored on the computer readable storage media for execution by at least one of the one or more processors, the stored program instructions comprising:

program instructions to create a user profile associated with a user storing one or more scheduled user events;

program instructions to determine one or more networks interfaces associated with the user profile;

program instructions to determine one or more network performance parameters and capabilities of one or more determined network interfaces;

program instructions to determine a highest ranked network connection based on the determined network performance parameters and capabilities of the one or more identified network interfaces, wherein network performance parameters and capabilities incorporate cost per unit of data;

program instructions to generate one or more network templates based on the determined highest ranked network connection and associated network performance parameters; and program instructions to apply the one or more generated network templates to a plurality of entities and devices.

16. The computer system of claim 15, wherein applying the network templates to the plurality of entities and devices, further comprises:

program instructions to redirect incompliant network traffic to an applied network template parameter selected from the following group: network interfaces, associated networks, protocols, and service providers.

17. The computer system of claim 15, further comprises:

program instructions to modify dynamically one or more generated network templates by a network choreographer based on one or more changes to group consisting of associated user profiles, application profiles, device profiles, network profiles, current network conditions, and predicted network conditions.

18. The computer system of claim 15, wherein determining the highest ranked network connection based on the determined network performance parameters and capabilities of the identified network interfaces, further comprises:

program instructions to detect one or more network requests based on the identified network interfaces;

program instructions to identify one or more applications requesting the one or more detected network requests;

program instructions to identify one or more users associated with the detected network request;

program instructions to identify one or more devices associated with the detected network request;

program instructions to identify one or more service providers associated with the one or more network interfaces;

program instructions to retrieve one or more historical profiles based on the identified one or more devices, applications, devices, service providers, and users;

program instructions to train one or more cognitive models based on the retrieved device profiles, application profiles, user profiles, associated service providers, and associated data transmission costs; and program instructions to determine an optimal network connection based on one or more calculations by the trained one or more cognitive models.

19. The computer system of claim 15, further comprises:

program instructions to retrieve one or more historical profiles;

program instructions to retrieve one or more network templates;

program instructions to adjust one or more weights in a cognitive model based on preferences and settings contained with the one or more historical profiles and network templates;

program instructions to feed the one or more identified network requests into the cognitive model, wherein the cognitive model utilizes one or more historical profiles and network templates, wherein the one or more historical profiles include historical user profiles, application profiles, device profiles, network interface profiles, and associated network profiles;

program instructions to predict application utilization based on one or more cognitive model calculations;

program instructions to predict device utilization based on one or more calculations by the cognitive model;

program instructions to predict one or more network conditions of the predicted application based on one or more calculations by the cognitive model; and program instructions to determine an optimal network connection based on current and predicted network conditions of the predicted application and the predicted device.

20. The computer system of claim 15, wherein determining one or more network performance and capabilities of the identified network interfaces, further comprises:

program instructions to retrieve one or more historically relevant device and network interface profiles;

program instructions to aggregate one or more service provider network connections associated with the identified network interfaces; and program instructions to conduct one or more intermittent tests to determine end-to-end network performance on the identified network interfaces and associated service provider connections.

* * * * *